(12) United States Patent
Zhang et al.

(10) Patent No.: US 11,147,104 B2
(45) Date of Patent: Oct. 12, 2021

(54) PRACH RESOURCE SELECTION

(71) Applicant: Apple Inc., Cupertino, CA (US)

(72) Inventors: Yujian Zhang, Beijing (CN); Seunghee Han, San Jose, CA (US); Gregory Morozov, Nizhny Novgorod (RU); Ansab Ali, Hillsboro, OR (US); Dae Won Lee, Portland, OR (US); Yongjun Kwak, Portland, OR (US)

(73) Assignee: Apple Inc., Cupertino, CA (US)

( * ) Notice: Subject to any disclaimer, the term of this patent is extended or adjusted under 35 U.S.C. 154(b) by 160 days.

(21) Appl. No.: 16/409,530

(22) Filed: May 10, 2019

(65) Prior Publication Data

US 2019/0268947 A1 Aug. 29, 2019

Related U.S. Application Data

(60) Provisional application No. 62/670,565, filed on May 11, 2018.

(51) Int. Cl.
| | |
|---|---|
| *H04W 74/08* | (2009.01) |
| *H04W 72/04* | (2009.01) |
| *H04J 11/00* | (2006.01) |
| *H04B 7/08* | (2006.01) |
| *H04B 7/0413* | (2017.01) |
| *H04B 17/327* | (2015.01) |
| *H04L 5/00* | (2006.01) |

(52) U.S. Cl.
CPC ...... *H04W 74/0833* (2013.01); *H04B 7/0413* (2013.01); *H04B 7/088* (2013.01); *H04B 17/327* (2015.01); *H04J 11/0073* (2013.01); *H04J 11/0076* (2013.01); *H04J 11/0079* (2013.01); *H04L 5/0048* (2013.01)

(58) Field of Classification Search
None
See application file for complete search history.

(56) References Cited

U.S. PATENT DOCUMENTS

| | | | | |
|---|---|---|---|---|
| 2018/0139036 A1* | 5/2018 | Islam | | H04W 56/001 |
| 2019/0007181 A1* | 1/2019 | Marinier | | H04L 5/0007 |
| 2019/0364603 A1* | 11/2019 | Qian | | H04J 13/0062 |
| 2020/0092740 A1* | 3/2020 | Yokomakura | | H04W 72/042 |
| 2020/0100301 A1* | 3/2020 | Kusashima | | H04W 24/08 |
| 2020/0127879 A1* | 4/2020 | Yokomakura | | H04L 27/2657 |
| 2020/0195358 A1* | 6/2020 | Yokomakura | | H04W 36/0094 |

* cited by examiner

*Primary Examiner* — Sai Aung
(74) *Attorney, Agent, or Firm* — Kowert, Hood, Munyon, Rankin & Goetzel, P.C.

(57) ABSTRACT

Systems and methods of selecting a PRACH resource opportunity are described. One of multiple Synchronization Signal Blocks (SSBs) is received. Each SSB has PSSs, SSSs and a PBCH that contain system information. A RACH occasion (RO) is selected from among multiple ROs associated with the SSB. A PRACH is transmitted on resources of the RO. The ROs are configured in a TDM and/or FDM manner. The RO is selected randomly or, if TDM is used, an earliest of the ROs from a UE-initiated RACH transmission in a previous period. A preamble of the RO is selected randomly with equal probability.

20 Claims, 6 Drawing Sheets

PRACH RESOURCE SELECTION

This application claims the benefit of priority to U.S. Provisional Patent Application Ser. No. 62/670,565, filed, May 11, 2018, which is incorporated herein by reference in its entirety.

TECHNICAL FIELD

Embodiments pertain to radio access networks (RANs). Some embodiments relate to cellular networks, including Third Generation Partnership Project (3GPP) $5^{th}$ generation (5G) New Radio (NR) (or next generation (NG)) networks. Some embodiments relate to random access procedures. In particular, some embodiments relate to physical random access channel (PRACH) resources.

BACKGROUND

The use of various types of systems has increased due to both an increase in the types of devices user equipment (UEs) using network resources as well as the amount of data and bandwidth being used by various applications, such as video streaming, operating on these UEs. To increase the ability of the network to contend with the explosion in network use and variation, the next generation of communication systems is being created. With the advent of any new technology, the introduction of a complex new communication system engenders a large number of issues to be addressed both in the system itself and in compatibility with previous systems and devices. Such issues arise, for example, in the random access procedures used by a UE when the UE has uplink (UL) data to transmit to the gNB.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate specific aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Figure 1:
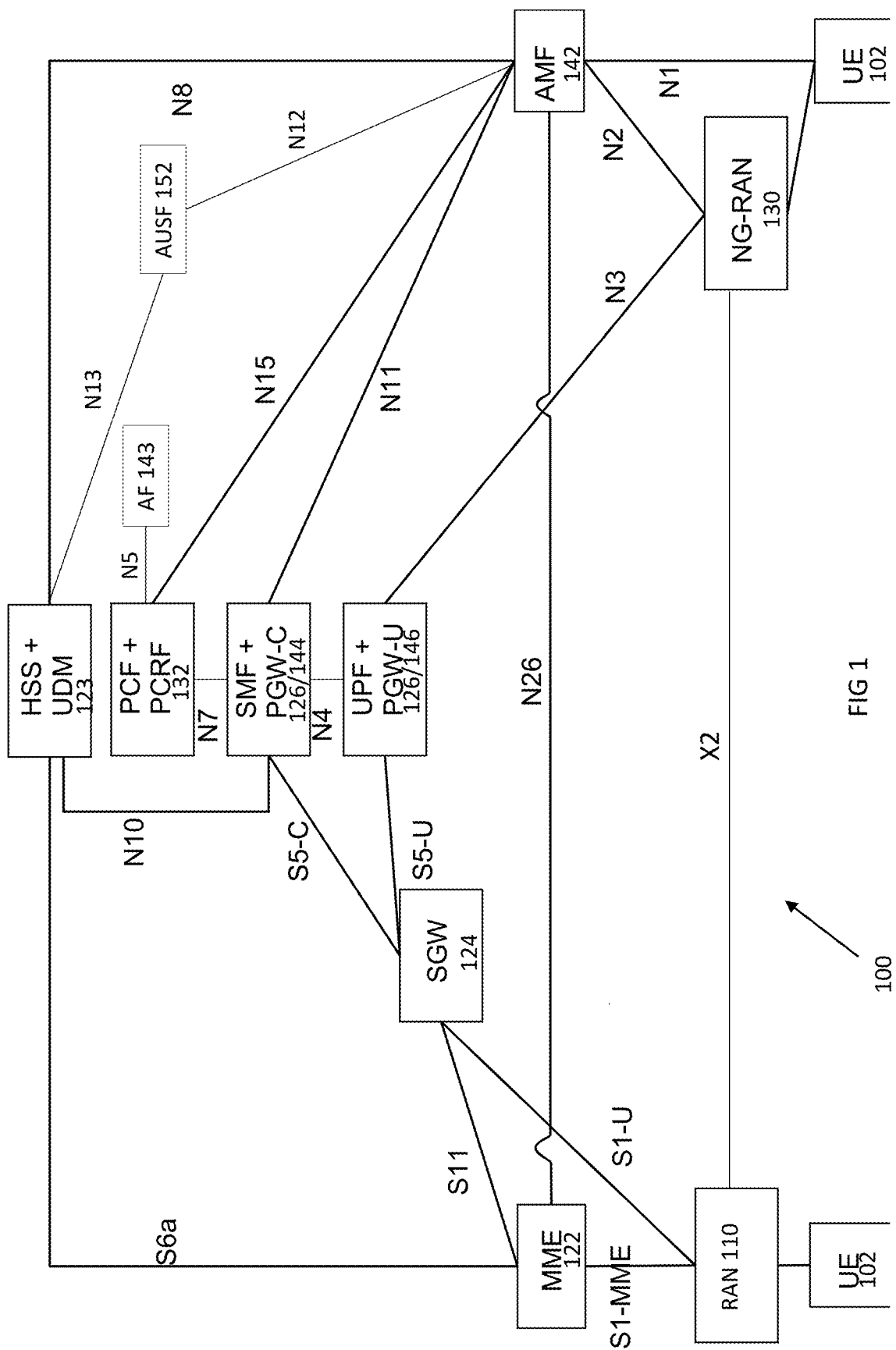
FIG. 1 illustrates combined communication system in accordance with some embodiments.

FIG. 1 illustrates a combined communication system in accordance with some embodiments. The system 100 includes 3GPP LTE/4G and NG network functions. A network function can be implemented as a discrete network element on a dedicated hardware, as a software instance running on dedicated hardware, or as a virtualized function instantiated on an appropriate platform, e.g., dedicated hardware or a cloud infrastructure.

The evolved packet core (EPC) of the LTE/4G network contains protocol and reference points defined for each entity. These core network (CN) entities may include a mobility management entity (MME) 122, serving gateway (S-GW) 124, and paging gateway (P-GW) 126.

In the NG network, the control plane and the user plane may be separated, which may permit independent scaling and distribution of the resources of each plane. The UE 102 may be connected to either an access network or random access network (RAN) 110 and/or may be connected to the NG-RAN 130 (gNB) or an Access and Mobility Function (AMF) 142. The RAN may be an eNB, a gNB or a general non-3GPP access point, such as that for Wi-Fi. The NG core network may contain multiple network functions besides the AMF 112. The UE 102 may generate, encode and perhaps encrypt uplink transmissions to, and decode (and decrypt) downlink transmissions from, the RAN 110 and/or gNB 130 (with the reverse being true by the RAN 110/gNB 130).

The network functions may include a User Plane Function (UPF) 146, a Session Management Function (SMF) 144, a Policy Control Function (PCF) 132, an Application Function (AF) 148, an Authentication Server Function (AUSF) 152 and User Data Management (UDM) 128. The various elements are connected by the NG reference points shown in FIG. 1.

The AMF 142 may provide UE-based authentication, authorization, mobility management, etc. The AMF 142 may be independent of the access technologies. The SMF 144 may be responsible for session management and allocation of IP addresses to the UE 102. The SMF 144 may also select and control the UPF 146 for data transfer. The SMF 144 may be associated with a single session of the UE 102 or multiple sessions of the UE 102. This is to say that the UE 102 may have multiple 5G sessions. Different SMFs may be allocated to each session. The use of different SMFs may permit each session to be individually managed. As a consequence, the functionalities of each session may be independent of each other. The UPF 126 may be connected with a data network, with which the UE 102 may communicate, the UE 102 transmitting uplink data to or receiving downlink data from the data network.

The AF 148 may provide information on the packet flow to the PCF 132 responsible for policy control to support a desired QoS. The PCF 132 may set mobility and session management policies for the UE 102. To this end, the PCF 132 may use the packet flow information to determine the appropriate policies for proper operation of the AMF 142 and SMF 144. The AUSF 152 may store data for UE authentication. The UDM 128 may similarly store the UE subscription data.

The gNB 130 may be a standalone gNB or a non-standalone gNB, e.g., operating in Dual Connectivity (DC) mode as a booster controlled by the eNB 110 through an X2 or Xn interface. At least some of functionality of the EPC and the NG CN may be shared (alternatively, separate components may be used for each of the combined component shown). The eNB 110 may be connected with an MME 122 of the EPC through an S1 interface and with a SGW 124 of the EPC 120 through an S1-U interface. The MME 122 may be connected with an HSS 128 through an S6a interface while the UDM is connected to the AMF 142 through the N8 interface. The SGW 124 may connected with the PGW 126 through an S5 interface (control plane PGW-C through S5-C and user plane PGW-U through S5-U). The PGW 126 may serve as an IP anchor for data through the internet.

The NG CN, as above, may contain an AMF 142, SMF 144 and UPF 146, among others. The eNB 110 and gNB 130 may communicate data with the SGW 124 of the EPC 120 and the UPF 146 of the NG CN. The MME 122 and the AMF 142 may be connected via the N26 interface to provide control information there between, if the N26 interface is supported by the EPC 120. In some embodiments, when the gNB 130 is a standalone gNB, the 5G CN and the EPC 120 may be connected via the N26 interface.

Figure 2:
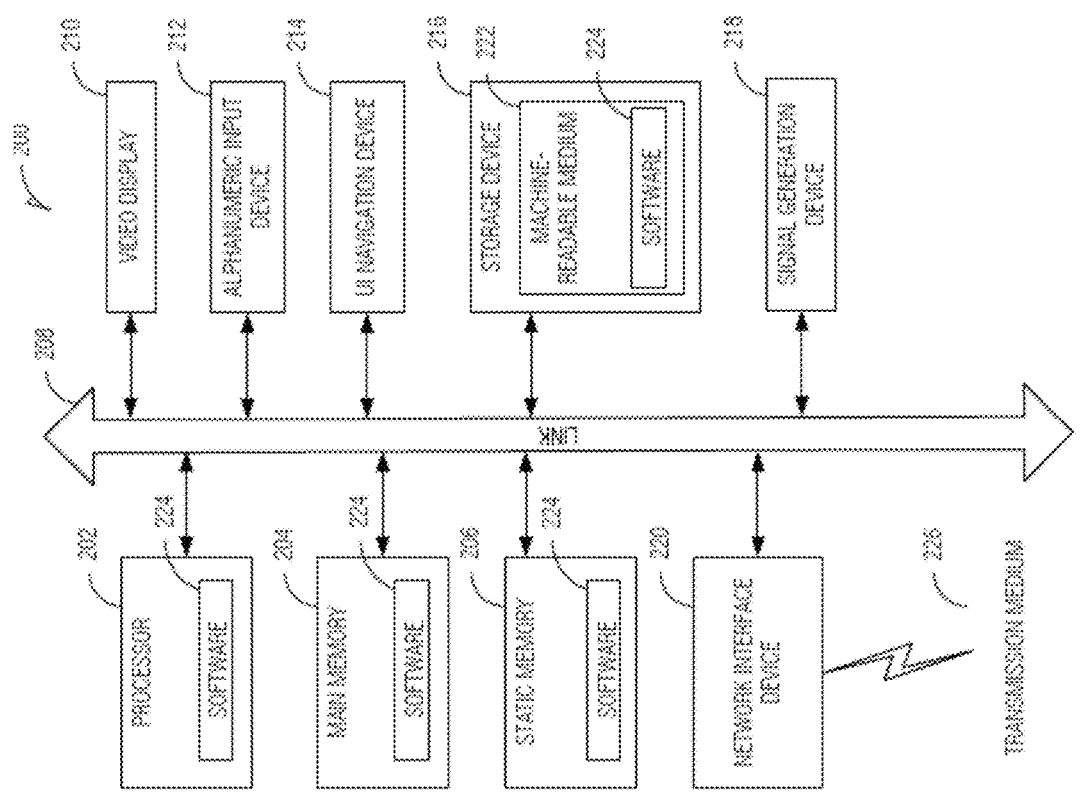
FIG. 2 illustrates a block diagram of a communication device in accordance with some embodiments.

FIG. 2 illustrates a block diagram of a communication device in accordance with some embodiments. In some embodiments, the communication device may be a UE, eNB, gNB or other equipment used in the network environment. For example, the communication device 200 may be a specialized computer, a personal or laptop computer (PC), a tablet PC, a mobile telephone, a smart phone, a network router, switch or bridge, or any machine capable of executing instructions (sequential or otherwise) that specify actions to be taken by that machine. In some embodiments, the communication device 200 may be embedded within other, non-communication based devices such as vehicles and appliances.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, successfully or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a NG/NR standards among others. In an example, the network interface device 220 may include one or more physical jacks (e.g., Ethernet, coaxial, or phone jacks) or one or more antennas to connect to the transmission medium 226.

Figure 3:
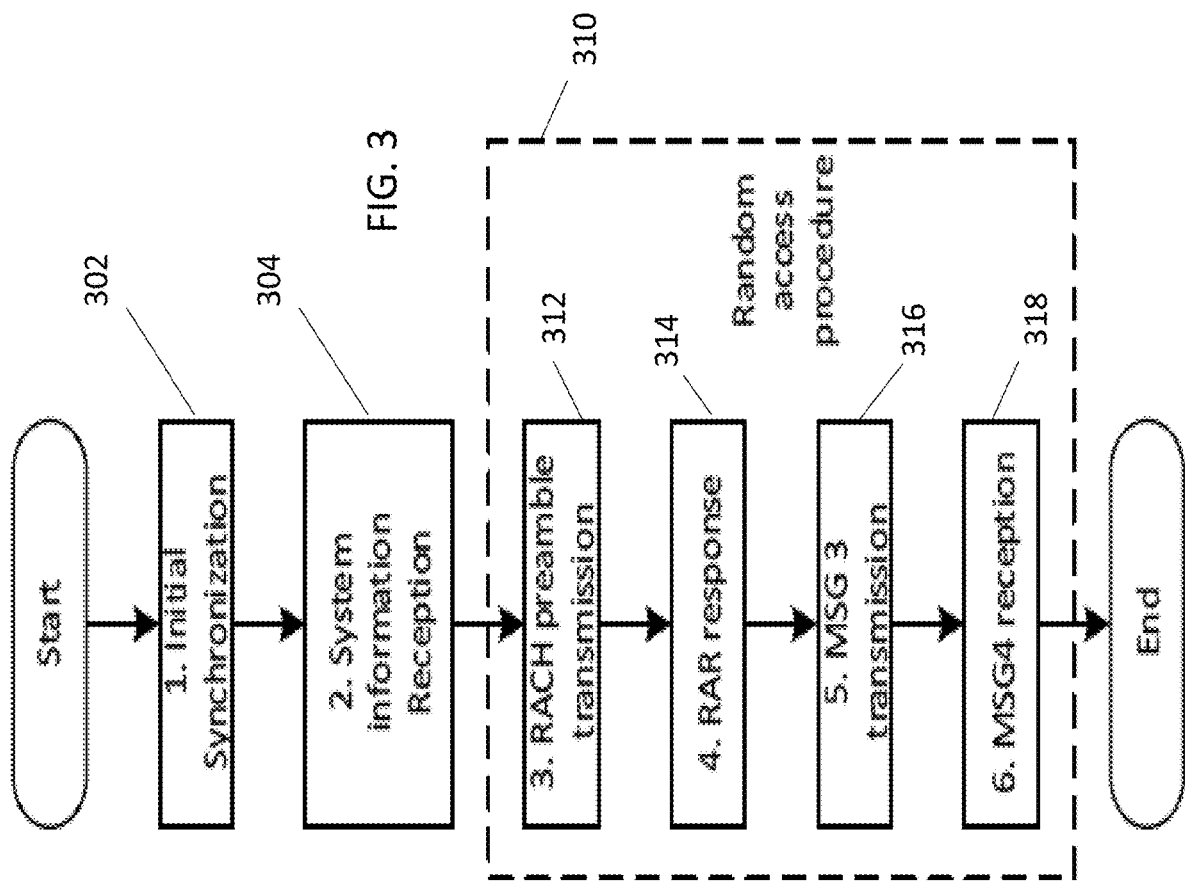
FIG. 3 illustrates an initial access procedure in accordance with some embodiments.

For the UE to make a connection with a gNB (cell), the UE may perform an initial access procedure. FIG. 3 illustrates an initial access procedure in accordance with some embodiments. When UE starts the initial access, the UE may first perform an initial synchronization by detecting primary synchronization signals (PSS) and secondary synchronization signals (SSS) at operation 302 to obtain the cell identity and frame timing. The PSS may provide slot timing and Physical Layer ID; the SSS may provide the physical layer cell identity group number for Radio Frame Timing detection, Physical Layer Cell ID, cyclic prefix length, FDD or TDD determination.

The UE may then obtain the system information during reception of the Physical Broadcast Channel (PBCH) in the SSB, which may carry the master information block (MIB) and system information blocks (SIBs) of the cell at operation 304. The UE may obtain random access procedure configuration information from the PBCH. The PSS (1 symbol) and SSS (1 symbol) and PBCH (2 symbols) may be provided in a Synchronization Signal Block (SSB). One or more SSBs may be transmitted in an SSB burst that is itself transmitted within an SS Burst Set that contains one or more SSB bursts of 5 ms (default). The periodicity of the SS Burst Set may be 20 ms. The number of possible candidate SSB locations within SS Burst Set is dependent on the frequency: 4 locations up to 3 GHz, 8 from 3 GHz to 6 GHz, and 64 from 6 GHz to 52.6 GHz.

After obtaining the random access procedure configuration information, the UE may perform a random access procedure at operation 310. The random access procedure may include the UE initially transmitting a physical random channel (PRACH) (Msg-1) at operation 312 and trying to receive a random access response (RAR) (Msg-2) in a physical downlink shared channel (PDSCH) at operation 314. The PRACH (xPRACH in NR) may carry a random access preamble from the UE towards the gNB. The PRACH may use the RA-RNTI and a selected Preamble Index. The PRACH may be sent at the time and frequency location determined from the RACH parameters in SIB2.

The preamble may be generated using Zadoff Chu (ZC) sequences. The preamble, if received by the gNB, may adjust uplink timing for message transmission by the UE, in addition to other parameters. The 5G NR random access preamble supports two different sequence lengths with various format configurations (Format 0, Format 1, Format 2, Format 3, Format A1, Format A2, Format A3, Format B1, Format B2, Format B3, Format B4, Format C0, Format C1). An 839 long preamble sequence is used by four preamble formats (0-3) that are designed for large cell deployment in the sub-6 GHz range (FR1) and have a subcarrier spacing of 1.25 KHz or 5 KHz; a 139 short preamble sequence is used by nine preamble formats (A-C) that are designed for small cell deployment/beam sweeping in both the FR1 range with a 15 or 30 KHz subcarrier spacing and mmwave (FR2) range (i.e., above 6 GHz) with a 60 or 120 KHz subcarrier spacing. There may be 64 preambles defined in each time-frequency PRACH occasion.

If no RAR is received by the UE inside a predefined (or configured) time window, the UE may retransmit the PRACH with increasing power until the UE receives the RAR. If the UE receives the RAR, the UE may then transmit Msg-3 (RRC Connection Request) at operation 316 using the resources indicated by the RAR and may receive Msg-4 (Contention Resolution, carrying the acknowledgment (ACK)+CRID) at operation 318, at which point the initial access procedure ends.

If multiple beams (beamforming) are used for a cell, the synchronization signals and system information may be measured by the UE to select a beam from among the multiple-input and multiple-output (MIMO) beams, which may then be used for PRACH transmission. The UE may identify the SSB using a time index carried by PBCH demodulation reference signals (DMRS). The UE may identify the best beam by identifying the beam with the highest Reference Signal Received Power (RSRP) or Reference Signal Received Quality (RSRQ) of the beam (e.g., PSS, SSS and/or DMRS).

An association between an SSB in the SS Burst Set and a subset of PRACH resources and/or preamble indices may be configured by a set of parameters in the system information. In particular, the mapping between the SSB and RACH occasion (RO) used to transmit the PRACH may be configured by the Remaining Minimum System Information (RMSI).

The UE may use the mapping between SSB and RO to select the RO for the transmission of the PRACH. If there is one RO mapped to a single SSB, then the UE can randomly select a preamble inside the RO associated with the SSB of interest with equal probability. However, if multiple ROs are mapped to as single SSB, then UE may additionally choose the RO for the transmission of the PRACH. To this end, multiple ROs can be located in the same time using FDM and/or TDM.

Figure 4:
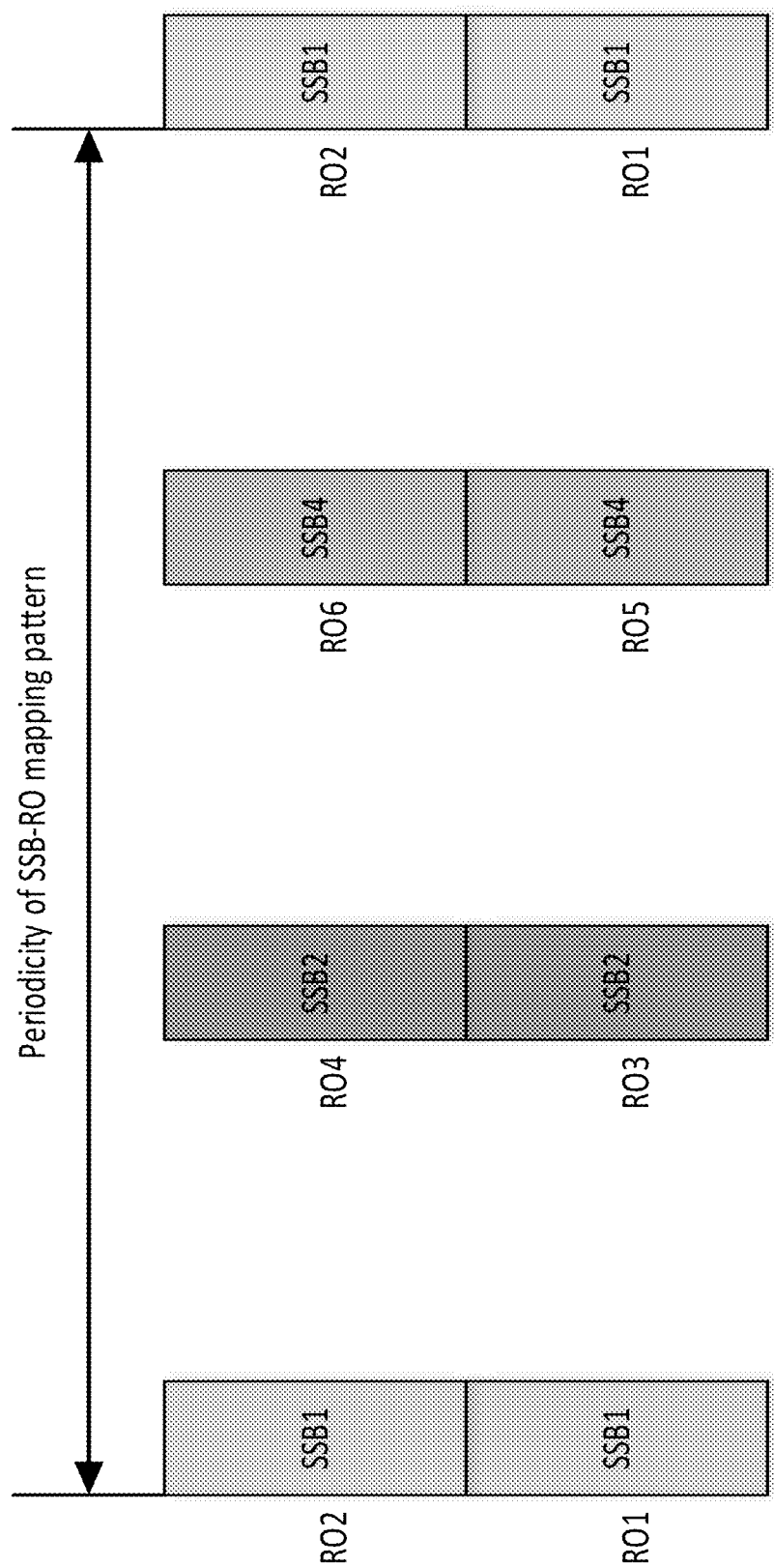
FIG. 4 illustrates RACH occasions (ROs) per Synchronization Signal Block (SSB) using frequency division multiplexing (FDM) in accordance with some embodiments.

FIG. 4 illustrates ROs per SSB using FDM in accordance with some embodiments. As shown in FIG. 4, 2 ROs may be mapped to a single SSB. The 2 ROs may configured in the same time but different frequency position, i.e., FDM manner. If a UE chooses a SSB for the transmission of PRACH, then the UE may choose the RO that is associated with the chosen SSB. For example, as shown in FIG. 4, if SSB1 is chosen by the UE, the UE may choose the RO among RO1 and RO2. The UE may then choose one preamble inside the selected RO. In some embodiments, the UE can randomly choose one RO between RO1 and RO2 with the equal probability. In this case, the collision rate for random access may be similar for UEs selecting RO1 and for UE selecting RO2. In other embodiments, the probability of selection may not be equal, may be supplied by the gNB in higher layer signaling or in the system information—for example if the gNB determines that use of a particular RO is more likely, the gNB may decide to "rebalance" the use of the ROs using the probabilities. As shown in FIG. 4, the ROs associated with the same SSB may be adjacent in terms of frequency.

Figure 5:
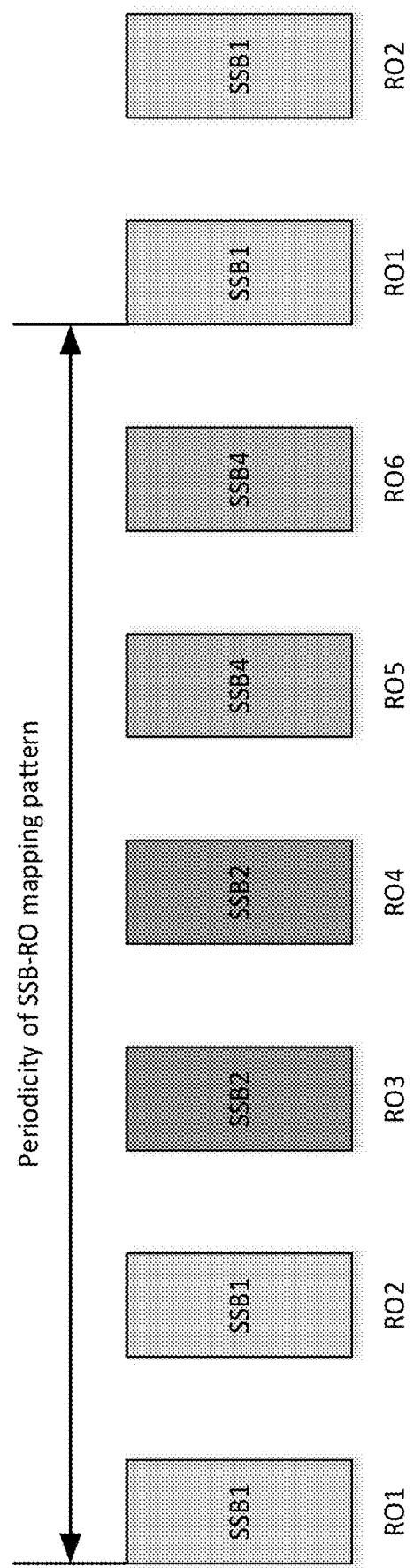
FIG. 5 illustrates ROs per SSB using time division multiplexing (TDM) in accordance with some embodiments.

FIG. 5 illustrates ROs per SSB using time division multiplexing (TDM) in accordance with some embodiments. As show in FIG. 5, 2 ROs may be mapped to a single SSB, and those 2 ROs may be configured at a different time (TDM). If a UE chooses a SSB for the transmission of the PRACH, the UE may choose the RO associated with the chosen SSB. For example, if SSB1 is chosen by the UE, the UE may choose either RO1 or RO2. After selection of RO1 or RO2, the UE may then choose one preamble inside the chosen RO.

As above, the UE can randomly choose one RO between RO1 and RO2 with the equal probability. In this case, the collision rate may be similar between RO1 and RO2. Alternatively, the UE can chose the earliest RO between RO1 and RO2. If the UE-initiated RACH transmission occurs before RO1 and after RO2 in the previous period, then the UE may select RO1. A UE-initiated RACH transmission after RO1 and before RO2 in the same period, however, may result in the UE choosing RO2. As shown in FIG. 5, the ROs associated with the same SSB may be adjacent in terms of time. In other embodiments, the ROs associated with the same SSB may be interleaved with the ROs of one or more of the other SSBs.

Figure 6:
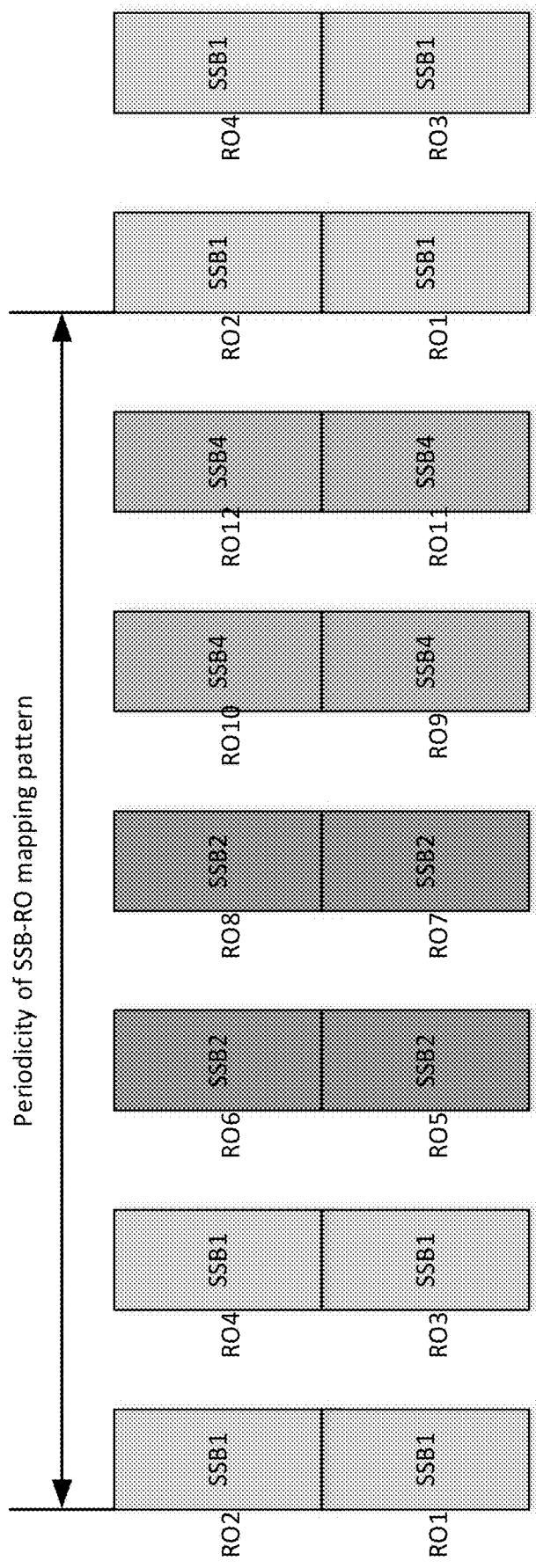
FIG. 6 illustrates ROs per SSB using FDM and TDM in accordance with some embodiments.

FIG. 6 illustrates ROs per SSB using FDM and TDM in accordance with some embodiments. As shown, multiple ROs may be mapped to a single SSB and multiple ROs configured for each SSB may be multiplexed in TDM and FDM manner. Thus, ROs are located in both different time and in frequency. As shown in FIG. 6, 4 ROs may be mapped to a single SSB. The 4 ROs may be configured in different time and frequency. If the UE chooses a SSB for the transmission of the PRACH, the UE may subsequently choose the RO associated with the chosen SSB. For example if SSB1 is chosen by the UE, the UE may select an RO among RO1, RO2, RO3, and RO4 and then choose one preamble inside the chosen RO. In some embodiments, the UE can randomly choose one RO among RO1, RO2, RO3, and RO4 with the equal probability. In this case, the collision rate may be similar among RO1, RO2, RO3, and RO4. Alternatively, if there is just a single SSB configured for a cell, the UE may merely choose the earliest RO for the transmission of the PRACH.

Thus, the medium access control (MAC) entity of the UE may determine whether one or more of the SSBs amongst the SSBs in candidateBeamRSList has an RSRP (SS-RSRP) above a predetermined threshold (rsrp-ThresholdSSB). If so, the MAC entity may select one of the SSBs and set the preamble index to a ra-PreambleIndex corresponding to the selected SSB from the set of Random Access Preambles for a beam failure recovery request (unless otherwise provided by a PDCCH). If contention-free Random Access Resources associated with SSBs have been explicitly provided in rach-ConfigDedicated and at least one SSB with SS-RSRP, of the associated SSBs, above the threshold is available, one of the SSBs is selected and the preamble index set to a ra-PreambleIndex corresponding to the selected SSB. In some embodiments, if the Random Access Resources for SI request have been explicitly provided by Radio Resource Control (RRC) messages and at least one of the SSBs with SS-RSRP above the threshold is available is available, one of the SSBs is selected, and the Random Access Preamble corresponding to the selected SSB is selected, from the Random Access Preambles determined according to ra-PreambleStartIndex as specified in TS 38.331. Once the SSB is selected, the next available PRACH occasion from the PRACH occasions corresponding to the selected SSB permitted by the restrictions given by a mask index (ra-ssb-OccasionMaskIndex) if configured or indicated by PDCCH (the MAC entity may select a PRACH occasion randomly with equal probability amongst the consecutive PRACH occasions according to TS 38.213), corresponding to the selected SSB; the MAC entity may take into account the occurrence of measurement gaps when determining the next available PRACH occasion corresponding to the selected SSB. The Random Access Preamble transmission procedure is then performed.

The UE may be provided a number (N) of SS/PBCH blocks associated with one PRACH occasion and a number (R) of contention based preambles per SS/PBCH block per valid PRACH occasion by ssb-perRACH-OccasionAndCB-PreamblesPerSSB. If N<1, one SS/PBCH block is mapped to 1/N consecutive valid PRACH occasions and R contention based preambles with consecutive indexes associated with the SS/PBCH block per valid PRACH occasion start from preamble index 0. If N>1, R contention based preambles with consecutive indexes associated with SS/PBCH block n, $0 \leq n \leq N-1$, per valid PRACH occasion start from preamble index $n \cdot N_{preamble}^{total}/N$ where $N_{preamble}^{total}$ is provided by totalNumberOfRA-Preambles and is an integer multiple of N.

SS/PBCH block indexes provided by ssb-PositionsInBurst in SIB1 or in ServingCellConfigCommon are mapped to valid PRACH occasions in the following order: 1) in increasing order of preamble indexes within a single PRACH occasion, 2) in increasing order of frequency resource indexes for frequency multiplexed PRACH occasions, 3) in increasing order of time resource indexes for time multiplexed PRACH occasions within a PRACH slot, and 4) increasing order of indexes for PRACH slots.

An association period, starting from frame 0, for mapping SS/PBCH blocks to PRACH occasions is the smallest value in the set determined by the PRACH configuration period according Table 1 such that $N_{Tx}^{SSB}$ SS/PBCH blocks are mapped at least once to the PRACH occasions within the association period, where the UE may obtain $A_{Tx}^{SSB}$ from the value of ssb-PositionsInBurst in SIB1 or in ServingCellConfigCommon. If after an integer number of SS/PBCH blocks to PRACH occasions mapping cycles within the association period there is a set of PRACH occasions that are not mapped to $N_{Tx}^{SSB}$ SS/PBCH blocks, no SS/PBCH blocks may be mapped to the set of PRACH occasions. An association pattern period may include one or more association periods and may be determined so that a pattern between PRACH occasions and SS/PBCH blocks repeats at most every 160 msec. PRACH occasions not associated with SS/PBCH blocks after an integer number of association periods, if any, may not be used for PRACH transmissions.

TABLE 1

Mapping between PRACH configuration period and SS/PBCH block to PRACH occasion association period

| PRACH configuration period (msec) | Association period (number of PRACH configuration periods) |
| --- | --- |
| 10 | {1, 2, 4, 8, 16} |
| 20 | {1, 2, 4, 8} |
| 40 | {1, 2, 4} |
| 80 | {1, 2} |
| 160 | {1} |

For a PRACH transmission triggered by a PDCCH order, the PRACH mask index field, if the value of the random access preamble index field is not zero, may indicate the PRACH occasion for the PRACH transmission where the PRACH occasions are associated with the SS/PBCH block index indicated by the SS/PBCH block index field of the PDCCH order. The PRACH occasions may be mapped consecutively per corresponding SS/PBCH block index. The indexing of the PRACH occasion indicated by the mask index value may be reset per mapping cycle of consecutive PRACH occasions per SS/PBCH block index. The UE may select for a PRACH transmission the PRACH occasion indicated by PRACH mask index value for the indicated SS/PBCH block index in the first available mapping cycle.

For the indicated preamble index, the ordering of the PRACH occasions may be: 1) in increasing order of frequency resource indexes for frequency multiplexed PRACH occasions, 2) in increasing order of time resource indexes for time multiplexed PRACH occasions within a PRACH slot, 3) in increasing order of indexes for PRACH slots.

Although an aspect has been described with reference to specific example aspects, it will be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus, the following claims are hereby incorporated into the Detailed Description, with each claim standing on its own as a separate aspect.

What is claimed is:

1. An apparatus comprising:
   at least one processor configured to cause a user equipment (UE) to:
      receive, from a next generation NodeB (gNB), one or more Synchronization Signal Blocks (SSBs) of a plurality of SSBs;
      select a first SSB of the one or more SSBs, the first SSB having a plurality of associated random access channel (RACH) occasions (ROs);
      select a RO from among the plurality of associated ROs, wherein said selecting the RO from among the plurality of associated ROs is performed randomly such that each of the plurality of associated ROs has an equal probability of being selected; and
      transmit, to the gNB, a physical random access channel (PRACH) using the selected RO.

2. The apparatus of claim 1, wherein the at least one processor is further configured to:
   in response to the PRACH, receive a physical random access response (RAR) from the gNB.

3. The apparatus of claim 2, wherein the at least one processor is further configured to:
   transmit, to the gNB, a message 3 in response to the RAR.

4. The apparatus of claim 1, wherein the plurality of associated ROs are associated with the first SSB according to a mapping pattern, wherein the mapping pattern is periodic.

5. The apparatus of claim 1, wherein each of the plurality of SSBs has an associated respective plurality of associated ROs.

6. The apparatus of claim 1, wherein the at least one processor is configured to randomly select a preamble of the selected RO with equal probability.

7. The apparatus of claim 1, wherein the plurality of associated ROs are configured according to one or more of: a time division multiplexing (TDM) manner or a frequency division multiplexing (FDM) manner.

8. A method for operating a user equipment (UE), comprising:
   by the UE:
      receiving, from a next generation NodeB (gNB), one or more Synchronization Signal Blocks (SSBs) of a plurality of SSBs;
      selecting a first SSB of the one or more SSBs, the first SSB having a plurality of associated random access channel (RACH) occasions (ROs);
      selecting a RO from among the plurality of associated ROs, wherein said selecting the RO from among the plurality of associated ROs is performed randomly such that each of the plurality of associated ROs has an equal probability of being selected; and
      transmitting, to the gNB, a physical random access channel (PRACH) using the selected RO.

9. The method of claim 8, further comprising:
   in response to the PRACH, receiving a physical random access response (RAR) from the gNB.

10. The method of claim 9, further comprising transmitting, to the gNB, a message 3 in response to the RAR.

11. The method of claim 8, wherein the plurality of associated ROs are associated with the first SSB according to a mapping pattern, wherein the mapping pattern is periodic.

12. The method of claim 8, wherein each of the plurality of SSBs has an associated respective plurality of associated ROs.

13. The method of claim 8, wherein the at least one processor is configured to randomly select a preamble of the selected RO with equal probability.

14. The method of claim 8, wherein the plurality of associated ROs are configured according to one or more of: a time division multiplexing (TDM) manner or a frequency division multiplexing (FDM) manner.

15. An apparatus comprising:
   at least one processor configured to cause a next generation NodeB (gNB) to:
      transmit a plurality of Synchronization Signal Blocks (SSBs), a first SSB having a plurality of random access channel (RACH) occasion (RO) associated therewith;
      receive, from a user equipment (UE), a physical random access channel (PRACH) on resources one of the plurality of ROs associated with the first SSB of the plurality of SSBs, wherein system information transmitted by the gNB includes a configuration of the plurality of ROs associated with the first SSB enabling selection of an RO of the plurality of ROs with equal probability; and
      in response to reception of the PRACH, transmit, to the UE, a random access response (RAR).

16. The apparatus of claim 15, wherein the at least one processor is further configured to:
   receive, in response to the RAR, a message 3 from the UE.

17. The apparatus of claim 15, wherein the plurality of associated ROs are associated with the first SSB according to a mapping pattern, wherein the mapping pattern is periodic.

18. The apparatus of claim 15, wherein each of the plurality of SSBs has an associated respective plurality of ROs.

19. The apparatus of claim 15, wherein the UE is further configured to randomly select a preamble of the selected RO with equal probability.

20. The apparatus of claim 15, wherein the plurality of ROs are configured according to one or more of: a time division multiplexing (TDM) manner or a frequency division multiplexing (FDM) manner.

* * * * *